United States Patent
Thorsson et al.

(10) Patent No.: US 7,740,683 B2
(45) Date of Patent: Jun. 22, 2010

(54) POWDER FOR MANUFACTURING PRECIOUS METAL PRODUCTS BY FREE FORMING FABRICATION AND PRODUCTS

(75) Inventors: Lena Thorsson, Karlskoga (SE); Allan Hede, Karlskoga (SE); Björn Eklund, Karlskoga (SE)

(73) Assignee: EOS GmbH Electro Optical Systems, Krailling/Munich (DE)

( * ) Notice: Subject to any disclaimer, the term of this patent is extended or adjusted under 35 U.S.C. 154(b) by 960 days.

(21) Appl. No.: 11/474,252

(22) Filed: Jun. 19, 2006

(65) Prior Publication Data

US 2007/0037002 A1    Feb. 15, 2007

Related U.S. Application Data

(63) Continuation of application No. PCT/SE2004/001327, filed on Sep. 15, 2004.

(30) Foreign Application Priority Data

Sep. 17, 2003    (SE) .................................... 0302468

(51) Int. Cl.
*B22F 1/00*    (2006.01)

(52) U.S. Cl. ....................................................... 75/255

(58) Field of Classification Search .................. 75/255, 75/247; 219/121.17, 121.66
See application file for complete search history.

(56) References Cited

U.S. PATENT DOCUMENTS

| 4,990,394 | A | * | 2/1991 | Shoher et al. ................ 428/212 |
| 5,578,383 | A | | 11/1996 | Beyer et al. |
| 2002/0125592 | A1 | | 9/2002 | Schulman et al. |

FOREIGN PATENT DOCUMENTS

| EP | 0 542 729 A2 | 5/1993 |
| WO | WO 02/092264 A1 | 11/2002 |

OTHER PUBLICATIONS

International Search Report for PCT/SE 2004/001327, 2 pages, dated Dec. 17, 2004.

* cited by examiner

*Primary Examiner*—Roy King
*Assistant Examiner*—Ngoclan T Mai
(74) *Attorney, Agent, or Firm*—Christie, Parker & Hale, LLP.

(57) ABSTRACT

The present invention relates to metal powders mixtures which are intended for manufacturing precious metal products which have special designs and complex geometries, also including those which consist of several uninterrupted parts which are indivisibly but flexibly coupled to each other. From the powder mixture jewelry and other objets d'art are manufactured by making use of free form fabrication (FFF) technique. The invention also comprises jewelry and other ornamental products which are manufactured from the powder material in question using the FFF technique.

6 Claims, No Drawings

POWDER FOR MANUFACTURING PRECIOUS METAL PRODUCTS BY FREE FORMING FABRICATION AND PRODUCTS

CROSS-REFERENCE TO RELATED APPLICATION(S)

This application is a continuation of International Application Number PCT/SE2004/001327, filed Sep. 15, 2004, which claims priority of SE 0302468-4, filed on Sep. 17, 2003, both of which are incorporated by reference herein.

SUMMARY OF THE INVENTION

The object of the present invention is to present novel types of alloyed metal powders and metal powder mixtures for manufacturing precious metal products in the form of objets d'art having special designs and complex geometries, including those which consist of several uninterrupted parts which are indivisibly but flexibly coupled to each other, such as necklaces, bracelets, other jewelry, different types of ornamental chains and the like. Using the novel material mixtures which have become available by means of the present invention, it has consequently become possible to manufacture all types of jewelry and other objets d'art by making use of a technique, i.e. what is termed the free form fabrication (FFF) technique, which is known per se but which has not previously been used within the trade for directly manufacturing jewelry. The invention also comprises jewelry and other objets d'art which have been manufactured from the powder material in question using the FFF technique.

A basic requirement for a finished article of jewelry is that it should have a precious metal content which is sufficiently high to enable the article to be hallmarked. By means of using the metal powders which are characteristic of the invention in conjunction with the technique which is now under discussion, and which is consequently termed generally free form fabrication (FFF), it has now become possible to manufacture objets d'art and jewelry having optional complex geometry, including those objets d'art and articles of jewelry which comprise complex geometries with doubly curved inner cavities, through holes and doubly curved outer surfaces, and all of which have a precious metal content which is sufficiently high to enable them to be hallmarked.

Within the goldsmithing and silversmithing trade, much of the artistic work is limited by the geometric restrictions which current manufacturing methods entail. A special group of precious metal products which are not relevant in this context are those which are shaped simply by means of mechanically working and/or soldering together constituent objects. Another method for manufacturing individual objects or small series of articles having specific complex outer geometries which is common today and which could advantageously be replaced by the present invention is the lost wax method, where a wax master is enclosed in plaster which is allowed to solidify, after which the wax is melted out and replaced with the precious metal, which is consequently cast in the cavity which the wax leaves behind. This method entails geometrical account having to be taken of casting gates, any possible air channels and the like, and also partition lines for the mould if this latter is intended to be used for several castings. While no preprepared mould partition is required if the mould is only intended to be used for one casting, the low intrinsic strength of the wax is included in all cases as a factor which limits how the master, and also the finished product, can be shaped. Nor do current manufacturing methods allow finished functions, such as links, to be manufactured directly other than to a very limited extent.

It has consequently now become possible, by means of the present invention, to make use of what is termed the free form fabrication (FFF) technique for manufacturing precious metal products having novel complex geometries and unique surface structures, at the same time as the productivity during the manufacturing stage can be increased and the handicraft work can be kept down in favor of designing.

The invention has consequently made it possible to develop collections, such as pendants, necklaces, bracelets and rings, etc., which have complex geometries and functions and which are executed in a single operation, as well as other types of jewelry.

The invention has furthermore made it possible to apply novel surface structures, which have only become available as a result of novel alloys which are characteristic of the invention, to these collections.

All the free form fabrication methods, for there are several such methods which are currently being used, are based on the construction, which is CAD/CAM-modelled and controlled by the CAD/CAM program, of the desired product in layers. (CAD=computer-aided design; CAM=computer-aided manufacture). The FFF manufacture consequently takes place by means of material being added successively. This represents a difference from older, more well-known manufacturing methods in which material is subtracted/removed by, for example, milling or turning or material is remodeled by, for example, pressing. Even if the basic principles of the free form fabrication methods are thus previously known, we do not know of any of these methods having been used for directly manufacturing precious metal products. Nor have we been able to find any information indicating that precious metal-based powder materials suitable for this purpose have already been available on the market.

According to one of the free form fabrication methods known today, usually termed the SLS [SLS=selective laser sintering] method, the material is constructed by means of the laser beam-controlled or electron beam-controlled coalescing or sintering of powder material. Each powder layer which is applied is sintered or coalesced within itself and with the preceding powder layer, by the laser beam or electron beam which is controlled by the CAD/CAM program, where the CAD/CAM model specifies that coherent material is required, whereas other parts of the powder layers are left untreated and can therefore subsequently be removed.

While the same basic principles can be used for manufacturing both metallic and polymeric material, the use of polymeric material is of no interest in this context.

In this variant (the SLS method) of free form fabrication, use is generally made of metal powder mixtures which comprise at least one more high-melting and one more low-melting powder type, where the more low-melting component of the mixture, i.e. the solder phase, is melted down under the influence of the laser controlled by the CAD/CAM program and binds the remaining powder material where the CAD/CAM model specifies that the finished product is to consist of solid material. The residual porosity of the finished product is reduced if parts of the remaining powder material, i.e. the basal phase, are also melted in this connection.

In another FFF method, use is made of a metal powder material which is completely melted by the product-defining laser beam or electron beam while, in yet another variant, use is made of a polymer-coated powder material where the polymer coating is melted down by the laser in a first step in order, on its solidification, to temporarily bind the metal particles which are then, in an aftertreatment, sintered together and infiltrated to final strength.

The basic concept behind the present invention is thus to offer novel types of metal powder material which have a content of precious metal which is sufficiently high to enable products which are manufactured from this material to be hallmarked. These materials should be able to be used together with several types of FFF methods even if we, for our part, have chosen to make use of the abovementioned SLS method, employing multicomponent powders, for our tests of the invention. Our more detailed examples, which are given further on in the text, will therefore relate to experiments carried out using this method.

As far as items of jewelry and other objets d'art are concerned, the strength of the finished product or the porosity of material which is included in it is not as a rule critical in this context. On the other hand, a requirement is that the finished products should have a precious metal content which ensures that they can be hallmarked. Nevertheless, certain demands on the mechanical properties of the material have to be met even in the case of jewelry and other objets d'art. If the item of jewelry is to contain mounted stones, the basal material must, for example, be sufficiently ductile to enable it to be moulded around the stones and at the same time sufficiently strong to ensure that the stones do not leave their mountings. Consequently, while the material demands are substantially lower than engineering demands, they cannot, for that reason, be disregarded.

It is the case with all the relevant FFF methods that the actual product-creating manufacturing process can be followed by a heat treatment or another aftertreatment. Several common gold-based alloys in the system Au—Ag—Cu are, for example, age-hardening, which means that the strength is very substantially improved if the material is subjected to two known and well-defined heat treatments; firstly a solution heat treatment and then an aging. The surface-finish of the product can be modified in an aesthetic manner by, for example, etching, polishing, abrasive blasting or other chemical or mechanical surface treatment.

The greatest advantage of free form fabrication methods is that, in these methods, the desired product is constructed entirely freely without tools, which also makes it possible to construct very complicated details which can also exhibit several internal cavities which are not connected to each other. In accordance with the present invention, this is exploited to produce chains or links which are manufactured in one operation and which can be relative to each other. Furthermore, several both internal and external double-curved surfaces can be included in the products in question. The free form fabrication methods consequently offer the designer what is in principle total geometric freedom in a manner which it has not previously been possible to achieve in connection with conventional turning, milling and casting. The advantage of free form fabrication is quite simply that, in this method, no demands are ever made for working spaces or access possibilities for tools. This technique offers special advantages in the jewelry context when it is a matter of manufacturing, in a single operation, several parts which are each uninterrupted and which are coupled flexibly to each other, such as all types of ornamental chains and links and other objects which can pivot relative to each other and which are link-shaped.

When chains or links or other products which, in the finished state, comprise components which pivot relative to each other are being manufactured, the only thing that is required, when an FFF method is being used, is that their edge parts, which normally abut each other in connection with the relative movements of the different components, be placed, in the CAD/CAM model, with an adequate clearance between each other and, in this connection, an intermediate position be expediently selected between the end positions of the movement patterns of the parts of the product which pivot relative to each other, at which positions there is no contact whatsoever between the parts.

As has already been described, the starting material in free form fabrication consists of a powder, and this provides good opportunities, when manufacturing jewelry, for varying the surface structure of the finished jewelry item as a result of using powders of different compositions and different grain sizes as well as different laser beam or electron beam parameters. Opportunities are also available during the course of the manufacturing process, to replace a powder with one which gives another color, surface structure or luster and which thereby gives the finished product another aesthetic dimension. In this connection, however, care must be taken to ensure that the replacement powder has metallurgical properties which are similar to those of the powder which is replaced.

In a quite general manner, it is the case that a finer powder gives better detail resolution but requires longer manufacturing time while a coarser powder, which consequently gives a finished product more rapidly, at the same time gives another surface finish. Employing powders of different coarseness can therefore be used to give the finished product an interesting surface structure.

The previously mentioned fineness requirement for hallmarking means that silver objects must have a silver content of at least 800/1000 or, alternatively, 925/1000 while the hallmarking requirement for gold objects means that the final product must be 14 or, alternatively, 18 carat, which means that it must contain 585/1000 or, respectively, 750/1000 parts of gold. In a corresponding manner, a fineness requirement of 850/1000 is required for hallmarking in the case of platinum.

In order to be able to be used within the previously presented SLS method, a precious metal-based powder material has to fulfill several basic requirements, the first of which is that the powder must contain, on the one hand, at least one solder phase or a solder material having a lower melting point or a higher laser absorption and, on the other hand, at least one basal phase or a basal material having a higher melting point or, alternatively, a lower laser absorption. The foremost task of the solder material in this connection is, by means of melting as a result of the effect of the laser, to sinter together the grains of the basal powder into one unit. In order to be able to fulfill this task in connection with the liquid phase sintering, the solder material must, in its melted state, wet the grains of the basal powder. As far as the solder material and the basal material are concerned, there is nothing to prevent them from each consisting of several different powder components at the same time as the precious metal content which is required for the hallmarking can in the main be concentrated principally to one of these phases or be distributed over all the phases. The main task of the solder phase is to bind together the powder grains of the basal phase and the main task of the basal phase, i.e. to be responsible for the dimensional stability and mechanical strength of the product, always remains.

In order to be able to be used in the SLS method, the powder material in question must fulfill certain specific requirements. Thus, in the first place, the powder must contain a basal material which constitutes the main part of the powder material employed and which is based on alloys of gold, silver or platinum. It is furthermore required, at the same time, that the powder material also contains a solder material which can also include all the metals which are regarded as being precious metals, together with copper and melting point-lowering alloying elements such as zinc, boron, aluminium, gallium, indium, silicon, germanium, tin, phosphorus, antimony and bismuth. Additives which clearly have an effect in improving the flowability and wetting ability of the melted alloy can also be included. Examples of such additives, i.e. what are termed fluxing materials, which can be integrated into the powder material and which may be mentioned are phosphorus, boron, silicon and, otherwise, metallic elements which have a greater affinity for oxygen than copper.

By means of selecting different alloying elements, the final color of the finished product can be varied in a manner which can provide the designer with good opportunities for making variations.

This can come to mean that, when using powder material which comprises several different powder materials, efforts may come to be made to arrange for the colors of these materials to be as close to each other as possible or, alternatively, that efforts may be made to have large color differences between the different powder components. The only restrictions which can be raised in this connection are that the colors of the different powder materials should be experienced by the human eye as being aesthetically attractive. Similar colors can signify rather similar compositions in the solder material and basal material while large differences indicate the contrary.

In the present case, and quite generally, the term precious metal which has been used thus far primarily means gold, silver and platinum but also all types of alloy which contain these metals and, in addition, the metals iridium, rhodium, ruthenium, palladium, osmium and rhenium and alloys containing these metals. While it is true, as has already been indicated, that the aim of the present invention is to offer starting materials for manufacturing precious metal products containing a precious metal content which is sufficient for the products to be able to be hallmarked, this does not affect what is meant, in this connection, by a precious metal.

According to the present invention, the basal material which is included, and whose main function and necessary properties have already been presented, should primarily consist of gold, silver or platinum as well as alloys thereof which can also contain all the other precious metals and, naturally, the usual impurities as well. It furthermore applies for the invention that a solder material should also be included, which solder material can also contain all the metals which are regarded as being precious metals and copper as alloying elements, together with one or more of the alloying metals zinc, boron, aluminium, gallium, indium, silicon, germanium, tin, phosphorus, antimony and bismuth.

Without their being able in themselves to be included among the precious metals, there is also the possibility of manufacturing very attractive jewelry from steel, and in that case perhaps first and foremost nickel-free stainless steel, and also from titanium. These two metals and alloys are very well-suited for being used in conjunction with the invention. The reason for including steel and titanium in this connection is the suitability of these metals as jewelry materials since these metals offer the designer interesting alternatives, especially if they are combined with one or more true precious metals.

Implemented Tests

A number of different powder mixtures have been tested as far as gold is concerned. The basal material in these tests has in the main consisted of an 18-carat gold alloy having the composition 75% Au, 12.5% Ag, and 12.5% Cu. On the other hand, a number of different solder materials of varying composition have been tested. The Au content in these solder materials has been at least 50% and the solder materials have otherwise contained one or some of the alloying elements Ag, Cu, Zn, Ga, In, Si, Ge, Sn and P, with a total content of at most 50%. While some of these solder materials have given good results, others have given results which are less good. Solder materials having compositions within the intervals 60-80% Au, 0-15% Ag, 5-15% Cu, 5-15% Sn and 0-2% P have worked well in the case of 18-carat gold objects. A solder having the composition 75% Au, 10-15% Cu, 10-15% Sn and approx. 1% P has proved to be of especial interest.

This solder material can either be based solely on a powder having this composition or on a powder mixture consisting, for example, of 80% Au, 20% Sn powder, 90% Au, 10% Sn powder and 87% Cu, 7% P, 6% Sn powder in the proportions 3:3:1. Some solders containing Si and Ge have also given good results, such as, for example, a solder material having the composition 92.5% Au, 6% Ge and 1.5% Si. In our experiments, the residual porosity has as a rule been less than 10% by volume, which must be regarded as being entirely satisfactory.

In two of our tests, we manufactured, after the requisite CAD/CAM preparations and in continuous machine operation, necklaces in alloys of gold and, respectively, silver, each of which consisted of some sixty links which were connected to each other flexibly but indivisibly, with the average total length of the links being approx. 12 mm, with the links having several different individual appearances and with the mutual flexibility between the links being at least as good as in the case of a corresponding chain produced from links joined together in accordance with prior art.

Probable Future Development Tendancies

As has previously been described, the SLS method currently uses a metal powder mixture which, however, may in future be replaced with a basal metal powder which is surface-coated with a more low-melting alloy. The more low-melting solder phase which is included as the surface coating in this connection would then be melted by the laser while the more high-melting basal phase would only be allowed to melt to a certain extent, something which ought to prove to be positive and give the final product a lower residual porosity.

In addition, the areas of application may be developed to encompass several types of jewelry, preferably objects which supplement the collections of pendants, necklaces and bracelets with, for example, rings and brooches. The ability to utilize the possibility for complex geometries and functions executed in a single operation is also likely to be developed. A natural development is to create new surface structures, which are only available through the technique, and new alloys.

For the rest, all the % contents which are given in the text refer to % by weight unless otherwise indicated.

The invention has otherwise been defined in the patent claims which follow.

What is claimed is:

1. Powder for manufacturing a precious metal product that has an appearance which is designed in advance and a precious metal content which is sufficiently high to allow the product to be hallmarked in accordance with existing laws, and which is manufactured by means of free form fabrication (FFF) in a CAD/CAM-controlled process during which the powder is supplied in layers and is caused to bind metallurgically within the regions of each layer, and between these regions, where information stored in the CAD/CAM programming specifies that the product should consist of solid material, said solid material having a total precious metal content of at least 50% by weight and containing at least one component which, during manufacture of the product, is melted down and which, in the melted phase, wets other components included in the powder, and has a powder size, powder form, and other properties which are adjusted to the CAD/CAM-CONTROLLED FFF process, and wherein alloyed within the powder is at least one metallic element having a greater affinity for oxygen than copper and which provides an inbuilt fluxing effect on a melt formed thereof.

2. Powder for manufacturing a precious metal product that has an appearance which is designed in advance and a precious metal content which is sufficiently high to allow the product to be hallmarked in accordance with existing laws, and which is manufactured by means of free form fabrication (FFF) in a CAD/CAM-controlled process during which the powder is supplied in layers and is caused to bind metallurgically within the regions of each layer, and between these regions, where information stored in the CAD/CAM programming specifies that the product should consist of solid material, said solid material having a total precious metal content of at least 50% by weight and containing at least one component which, during manufacture of the product, is melted down and which, in the melted phase, wets other components included in the powder, and has a powder size, powder form, and other properties which are adjusted to the CAD/CAM-CONTROLLED FFF process, wherein the powder comprises a mixture of at least two different solid materials, one of which (the solder material) has a lower melting point which is sufficiently low for the solid material to be completely melted down by the laser beam or electron beam used in the manufacturing process and, in the melted state, wets the solid material having the higher melting point (the basal material), with the solid material having the higher melting point constituting 60-90% by weight of the entire powder quantity, and wherein the basal material contains a powder having a 14-18-carat content of gold.

3. Powder for manufacturing a precious metal product that has an appearance which is designed in advance and a precious metal content which is sufficiently high to allow the product to be hallmarked in accordance with existing laws, and which is manufactured by means of free form fabrication (FFF) in a CAD/CAM-controlled process during which the powder is supplied in layers and is caused to bind metallurgically within the regions of each layer, and between these regions, where information stored in the CAD/CAM programming specifies that the product should consist of solid material, said solid material having a total precious metal content of at least 50% by weight and containing at least one component which, during manufacture of the product, is melted down and which, in the melted phase, wets other components included in the powder, and has a powder size, powder form, and other properties which are adjusted to the CAD/CAM-CONTROLLED FFF process, wherein the powder comprises a mixture of at least two different solid materials, one of which (the solder material) has a lower melting point which is sufficiently low for the solid material to be completely melted down by the laser beam or electron beam used in the manufacturing process and, in the melted state, wets the solid material having the higher melting point (the basal material), with the solid material having the higher melting point constituting 60-90% by weight of the entire powder quantity, and wherein the basal material contains at least 80% silver by weight.

4. Powder for manufacturing a precious metal product that has an appearance which is designed in advance and a precious metal content which is sufficiently high to allow the product to be hallmarked in accordance with existing laws, and which is manufactured by means of free form fabrication (FFF) in a CAD/CAM-controlled process during which the powder is supplied in layers and is caused to bind metallurgically within the regions of each layer, and between these regions, where information stored in the CAD/CAM programming specifies that the product should consist of solid material, said solid material having a total precious metal content of at least 50% by weight and containing at least one component which, during manufacture of the product, is melted down and which, in the melted phase, wets other components included in the powder, and has a powder size, powder form, and other properties which are adjusted to the CAD/CAM-CONTROLLED FFF process, wherein the powder comprises a mixture of at least two different solid materials, one of which (the solder material) has a lower melting point which is sufficiently low for the solid material to be completely melted down by the laser beam or electron beam used in the manufacturing process and, in the melted state, wets the solid material having the higher melting point (the basal material), with the solid material having the higher melting point constituting 60-90% by weight of the entire powder quantity, and wherein the solder material has a total Au content of at least 50% by weight, with preferably at least 75% Au content by weight in the case of 18-carat gold objects and at least 58.5% Au content by weight in the case of 14-carat gold objects, and at least one of the elements selected from the group consisting of Cu, Ag, Zn, Ga, In, Si, Ge, Sn, P and Sb.

5. Powder for manufacturing a precious metal product that has an appearance which is designed in advance and a precious metal content which is sufficiently high to allow the product to be hallmarked in accordance with existing laws, and which is manufactured by means of free form fabrication (FFF) in a CAD/CAM-controlled process during which the powder is supplied in layers and is caused to bind metallurgically within the regions of each layer, and between these regions, where information stored in the CAD/CAM programming specifies that the product should consist of solid material, said solid material having a total precious metal content of at least 50% by weight and containing at least one component which, during manufacture of the product, is melted down and which, in the melted phase, wets other components included in the powder, and has a powder size, powder form, and other properties which are adjusted to the CAD/CAM-CONTROLLED FFF process, wherein the powder comprises a mixture of at least two different solid materials, one of which (the solder material) has a lower melting point which is sufficiently low for the solid material to be completely melted down by the laser beam or electron beam used in the manufacturing process and, in the melted state, wets the solid material having the higher melting point (the basal material), with the solid material having the higher melting point constituting 60-90% by weight of the entire powder quantity, and wherein the solder material contains by weight 75% Au, 0-15% Ag, 0-20% Sn, 0-5% Si, 0-12% Ge and 0-5% P.

6. Powder for manufacturing a precious metal product that has an appearance which is designed in advance and a precious metal content which is sufficiently high to allow the product to be hallmarked in accordance with existing laws, and which is manufactured by means of free form fabrication (FFF) in a CAD/CAM-controlled process during which the powder is supplied in layers and is caused to bind metallurgically within the regions of each layer, and between these regions, where information stored in the CAD/CAM programming specifies that the product should consist of solid material, said solid material having a total precious metal content of at least 50% by weight and containing at least one component which, during manufacture of the product, is melted down and which, in the melted phase, wets other components included in the powder, and has a powder size, powder form, and other properties which are adjusted to the CAD/CAM-CONTROLLED FFF process, wherein the powder comprises a mixture of at least two different solid materials, one of which (the solder material) has a lower melting point which is sufficiently low for the solid material to be completely melted down by the laser beam or electron beam used in the manufacturing process and, in the melted state, wets the solid material having the higher melting point (the basal material), with the solid material having the higher melting point constituting 60-90% by weight of the entire powder quantity, and wherein the solder material contains by weight 75% Au, 10-15% Cu, 10-15% Sn and 0-5% P.

* * * * *